March 17, 1953 — T. J. AULT — 2,631,885
CONTAINER FASTENING APPARATUS FOR TRANSPORT VEHICLES
Filed May 8, 1950 — 2 SHEETS—SHEET 2
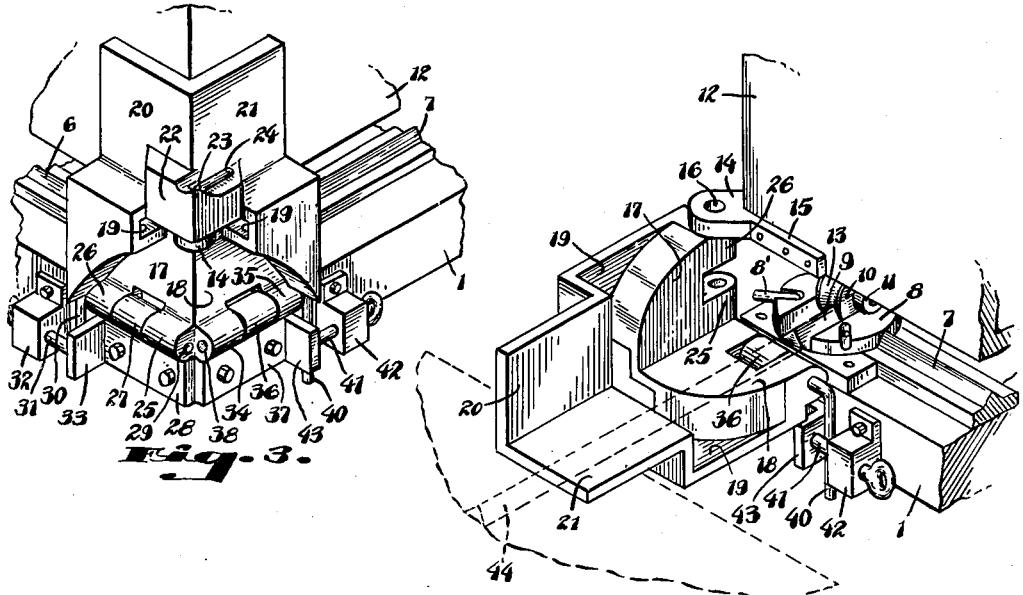
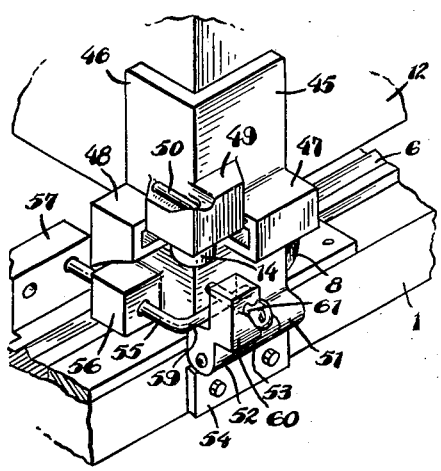
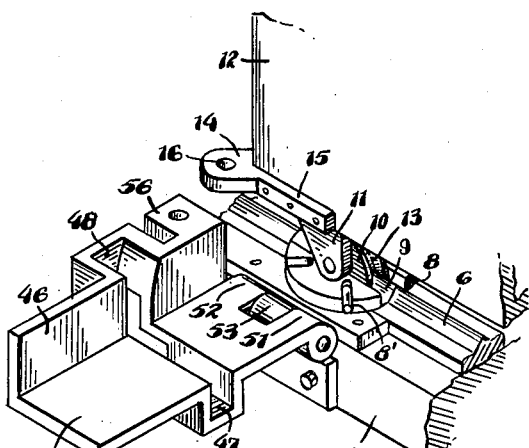
INVENTOR.
THOMAS J. AULT,
BY:
A. P. Hahn.
ATTORNEY.

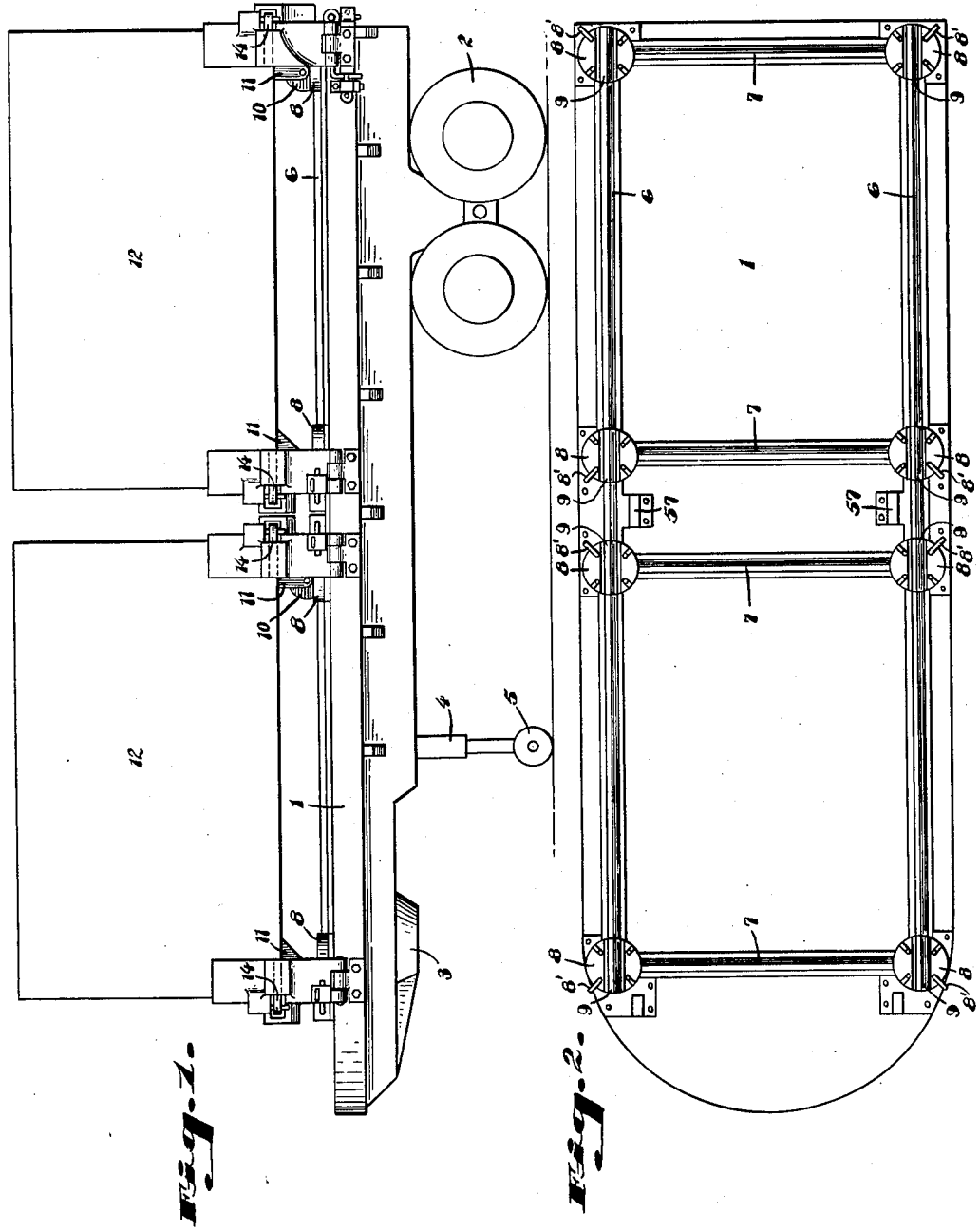

Patented Mar. 17, 1953

2,631,885

UNITED STATES PATENT OFFICE 2,631,885

CONTAINER FASTENING APPARATUS FOR TRANSPORT VEHICLES

Thomas J. Ault, Muncie, Ind.

Application May 8, 1950, Serial No. 160,668

7 Claims. (Cl. 296—35)

The present invention relates to container carriers, such as railroad cars, motor trucks or trailers. More specifically my invention relates to the means for holding a plurality of containers supported upon the carrier body against shifting, while permitting a removal of the individual containers carried upon the supporting body either from the end or from the side thereof.

One of the objects of my invention is to provide a container carrier adapted to support a multiplicity of containers, in which the goods may be deposited for transportation purposes, having means for locking the individual containers against shifting movement either laterally, transversely or vertically of the carrier body.

Another object of my invention is to provide a carrier so constructed that the containers may be removed from the tail end of the carrier body or from the side of the carrier body as occasion demands.

Another object of my invention is to provide locking means which will lock the container carried on the body at each of the four corners thereof in such a manner that the individual container will be locked securely against shifting movement either transversely, laterally or vertically.

Another object of my invention is to provide locking means which will also provide a gate or bridge for bridging the space between the carrier body and the loading platform on to which the container is to be deposited from the carrier.

For the purpose of disclosing my invention I have disclosed an embodiment thereof in the accompanying drawings in which:

Fig. 1 is a side elevation of the container carrier embodying my invention;

Fig. 2 is a plan view of the floor of the container carrier;

Fig. 3 is a detailed perspective view of one of the corner locking means;

Fig. 4 is a detailed perspective view showing the corner locking means dropped into unloading position;

Fig. 5 is a perspective view of a side corner locking means and

Fig. 6 is a perspective view showing the locking means dropped into loading position.

In the embodiment illustrated I have shown a trailer adapted for suitable connection with a hauling truck of the present commercial type. This trailer is provided with a body or platform 1 which is supported in the usual manner on the rear supporting wheels 2 and having at its front end a connecting means 3 for connecting the front end of the structure with the hauling truck as usual in structures of this kind. Supporting posts 4 having wheels 5 thereon are provided near the front end for supporting the front end of the body when detached from the hauling truck.

The body 1 comprises a platform provided with longitudinally disposed parallel tracks 6—6 adjacent the sides of the body.

The body 1 is also provided with a plurality of sets of spaced apart transversely extending tracks 7—7 and there may be as many pairs of transversely extending tracks 7—7 as is desired, depending upon the number of containers adapted to be supported upon the body. The ends of the tracks 7—7 cooperate with turntables which turntables are positioned at the junction between the transversely extending tracks and the longitudinally extending tracks. The turntables 8 are each provided with track sections 9 so positioned that when the turntables are turned in one direction track sections 9 will coincide with the longitudinal tracks 6 and when turned 90° the track sections 9 will coincide with the transverse track section 7. This arrangement permits the container to be rolled on to the body platform either from the end or the side thereof.

I have illustrated the truck platform 1 as being capable of accommodating two containers. The turntables may be locked in their adjacent positions by suitable locking pins 8' extending through openings in the turntables and taking into openings in the truck platform.

While I have illustrated the platform as supporting two containers it will be understood of course, that the number of containers may be increased by increasing the length of the truck platform or by reducing the size of each container.

From a commercial stand point, however, and from my experience in handling transport material I have found that for a truck platform coinciding in length and width to the present day commercial type of trailer two containers are satisfactory.

Each of the containers is provided at its four corners with caster mounted wheels 10 suitably mounted in ball bearing caster supports 11 which are secured to the four corners of each of the containers 12. These caster wheels 10 are provided each with a groove 13 adapted to receive the raised tracks 6 and 7. If desired the track sections may be grooved to include flanges on the wheels.

Each of the containers 12 is provided at its corners with a locking eye lug 14 extending from a pair of arms 15 secured to and parallel with the side and end of the container in such a manner that the eye lug 14 extends at an angle from the corner of the container. The eye arm is provided with an opening 16, the purpose of which will appear more fully hereinafter.

For embracing the corners of the containers and locking the same into position I provide corner locking members. These locking members which engage and lock the containers at the rear end of the platform are so constructed as to swing longitudinally or transversely of the platform.

As the construction of the two tail end locking members is the same a description of only one will be necessary. Each of the tail end members comprises a rectangular corner member having relatively thick walls 17 and 18 providing grooves 19 to accommodate the eye member 14 as the lock member is swung into locking position. The upper walls 20 and 21 are relatively thinner and are shouldered in so that their inner faces form a continuation of the walls 17 and 18. The walls 20 and 21 have a hollow offset corner boss 22 which is so disposed that when the locking member is swung into locking position the eye lug 14 passing through an opening in the corners of the locking member will be positioned beneath the boss. A vertical opening in the boss is adapted to coincide with the opening 16 in the eye lug 14 to permit the passage therethrough of a locking pin 23. Each of the bosses 22 has on its upper face a groove or recess to accommodate the angularly extending arm 24 of the locking pin when the pin is in locking position. The locking pin is provided with a spring biasing it in its locking position and when in its locking position portion 24 rests in the groove to prevent rotation of the same.

The side wall 17 is provided with a pair of hinge members 25 and 26 which receive between the same a hinge member 27 secured by a plate 28 to the end of the body platform 1. A hinge pin 29 extends through the hinge members to provide a swinging hinge permitting the locking member to be swung outwardly from the tail end of the platform. One end of the hinge pin 29 is turned at right angles to provide a handle 30 which in lock up position rests behind a locking pin 31 passing through a lug 32 secured to the side of the platform. This locking pin abuts against a stop plate 33 so that in normal operation the hinge pin 29 cannot be withdrawn from its hinging position.

The opposite side 18 of the lock up member is provided with a pair of hinge members 34 and 35 which receive between them a hinge member 36 secured by a plate 37 to the side of the platform. A pin 38 similar to pin 29 provides a hinge pin on which the lock up member may swing. This hinge pin is provided with a handle 40 normally positioned behind a lock pin 41 extending through a lug 42 against a plate 43, both the pin and lug being fastened to the side of the platform 1.

By the above arrangement the tail corners of the rearmost container are locked against transverse, vertical or longitudinal displacement. The eye lug 14 fitting into the socket formed by the extensions 22 prevents vertical movement of the container.

The corner member embraces the side and end of the container and prevents transverse and longitudinal displacement. The pin 23 also locks the corner lock up member in lock up position.

The tail corner members provide means whereby the container may be moved longitudinally off the body 1 to deliver to a suitable loading dock. To accomplish this all that is necessary is to remove the hinge pin 29 and the locking pin 23. With the hinge pin 29 removed and the locking pin 23 released the corner member may be swung on the hinge members 34, 35 and 36 to a position shown in Fig. 4. That is in a direction to permit the container to be delivered from the tail end of the body. To accommodate the grooved wheels on which the container rests, supplemental tracks such as 44 may be laid on top of the lock up member, as shown in Fig. 4, to bridge recessed portion 19.

In event it be desired to deliver the contents from the side of the platform the pin 38 may be removed and the corner member swung on the hinge members 25, 26 and 27.

Due to the fact that the rollers or wheels 10 are mounted on casters, pressure applied to the side of the container to be removed will cause the wheel to rotate on the casters as well as cause the turntables to rotate when unlocked so that the container will ride on the track base.

The intermediate locking members and the locking member at the front end of the platform are of the same construction and it is therefore necessary only to describe one of these structures. Each of these structures comprises a pair of angularly disposed walls 45 and 46 which embrace the corner of the container. These walls have offset recesses 47 and 48 which accommodate the lugs 14 and the corner member is provided with a lug 49 disposed over an opening in the corner lug. This opening accommodates the eye member 14. This lug has a vertical opening therein adapted to coincide with the eye 16 to receive a locking pin, the handle 50 of which is adapted when in locked position to ride in a groove on the top of the angularly disposed lug 49.

The side wall 45 of the corner member is provided with a pair of hinge members 51 and 52 which receive between them the hinge member 53 carried by plate 54 secured to the side of the platform 1. This provides a hinge which permits the corner member to be swung transversely of the platform 1. Normally the lock up member is locked in its vertical or embracing position through the medium of a pin 55 passing through an opening in a lug 56 on the side 46 of the corner member and into an opening into a lug 57 secured to the platform 1. The pin 55 is provided with a handle 59 lying, in lock up position between a lug 60 on the wall 45 and the wall. A pin 61 passing through the lug 60 prevents the handle 59 from turning out of position. By this construction the center and front ends of the containers are restrained against displacement.

At the same time the corner locking members may be swung transversely of the platform so that the container may be rolled off the platform, the locking member providing a gate between the vehicle platform and the loading platform. Tracks like those used with the tail locking members may be placed in position to accommodate the caster wheels.

I claim as my invention:

1. In combination, a carrier having a flat unobstructed bed, parallel tracks fore and aft on said bed and a series of pairs of parallel tracks extending at right angles to said fore and aft tracks and mounted on said bed, turntables rotatably mounted on said bed at the junction between said fore and aft and right angled tracks, having track sections thereon adapted to coincide with either set of tracks, a container having casters on the bottom thereof adapted to ride on said tracks and locking members disposed at the junction between said fore and aft and right angle tracks hingedly mounted on the side of said bed and swingable from a horizontal to a vertical position, the side walls of said locking members conforming to the exterior surfaces of said container thereby to embrace said surfaces and means for locking said locking member to the said surfaces of said container.

2. In combination, a carrier having a flat unobstructed bed, parallel tracks extending fore and aft of said bed and a series of pairs of parallel tracks extending at right angles to said fore and aft tracks mounted on said bed, turntables rotatably mounted on said bed at the junction between said fore and aft and right angled track sections, track sections mounted on said turntables and adapted to coincide with either set of tracks, a container having corners and including casters on the bottom thereof adapted to ride on said tracks and locking members disposed at the junction between said fore and aft and right angled tracks hingedly mounted on the side of said bed and swingable from a horizontal to a vertical position, said locking members having side walls defining corners adapted to embrace the corners of the container and means for locking the corners of the container to said locking members against vertical displacement of the container relatively to the carrier bed.

3. In combination, a container carrier and a container removably supported thereon, rectangularly spaced slotted locking members hingedly connected to the sides of the carrier bed, the side walls of each locking member conforming to the exterior surfaces of said container thereby to embrace said surfaces, a plurality of locking lugs spaced on the container to align with said locking members and having portions inter-engaging with the slotted portion of each of said locking members and preventing vertical displacement of the container relatively to the carrier when so engaged, said interengaging portions having vertically disposed registering pin receiving openings therein and a locking pin inserted in said openings for locking the locking member against lateral displacement.

4. In combination, a container carrier, a rectangular container removably supported thereon, spaced locking members hingedly connected to the sides of said carrier, each of said locking members having walls defining corners for embracing corners of the container and having a lug receiving opening therein, a locking lug on each corner of the container, each lug having a portion engaging in the lug receiving opening of said locking member and preventing vertical displacement of the container relatively to the carrier and means for interlocking said lug in the lug receiving opening of said locking member to prevent displacement of said locking member from it's corner embracing position.

5. In combination, a container carrier and a rectangular container removably supported thereon, a locking member having walls defining a corner for embracing a corner of the container, releasable hinge connecting means connecting one wall of said locking member to the side of the container, releasable hinge connecting means connecting the other wall of the locking member to the end of the carrier said connecting means being selectively releasable to permit said locking member to be swung either in a longitudinal or a transverse direction.

6. In combination, a container carrier and a rectangular container removably supported thereon, spaced locking members hingedly connected to the sides of the carrier, each of said locking member comprising corner members for embracing a corner of the container, said locking members being swingable from a vertical to a horizontal position, the hinge connection between said locking member and the side wall of the carrier comprising angularly disposed hinges for permitting rotational movement laterally or longitudinally of said carrier and being so disposed that when the locking member is swung into a horizontal position the inner face of a wall there of is in the same plane as the plane of the top of the carrier and when the locking member is moved to an upright position its side walls embrace the corner of the container.

7. In combination, a container carrier and a rectangular container removably supported thereon, spaced locking members each hingedly connected to a side wall of the carrier, each of said locking members comprising corner members for embracing a corner of the container, a locking lug on each corner of the container, each of said lugs being adapted to extend through the walls of a locking member, a locking lug on the exterior of the locking member aligned, when the locking member is moved to an upright position, with the locking lug, and a pin insertable through openings in said lugs for preventing displacement of the locking member relatively to the corners of the container, said lugs cooperating to prevent vertical displacement of the container relatively to the carrier.

THOMAS J. AULT.

REFERENCES CITED

The following references are of record in the file of this patent:

UNITED STATES PATENTS

| Number | Name | Date |
|---|---|---|
| 1,287,759 | Russell | Dec. 17, 1918 |
| 1,845,593 | Fildes | Feb. 16, 1932 |
| 1,860,747 | McLaughlin | May 31, 1932 |
| 1,988,651 | Fildes | Jan. 22, 1935 |
| 2,017,414 | Liebegott | Oct. 15, 1935 |
| 2,053,969 | Olds | Sept. 8, 1936 |
| 2,355,867 | Jarvis | Aug. 15, 1944 |